United States Patent Office 3,554,851
Patented Jan. 12, 1971

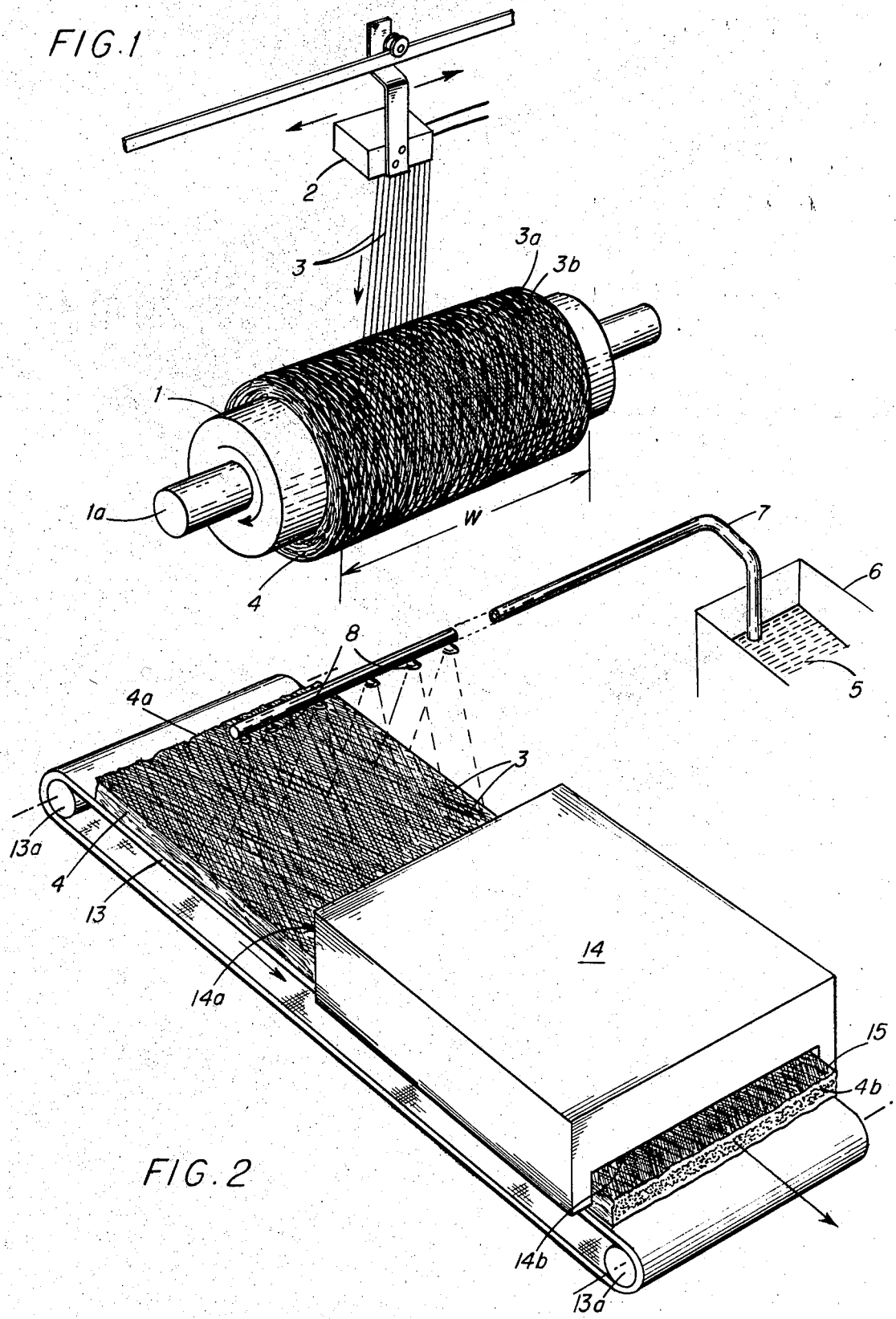

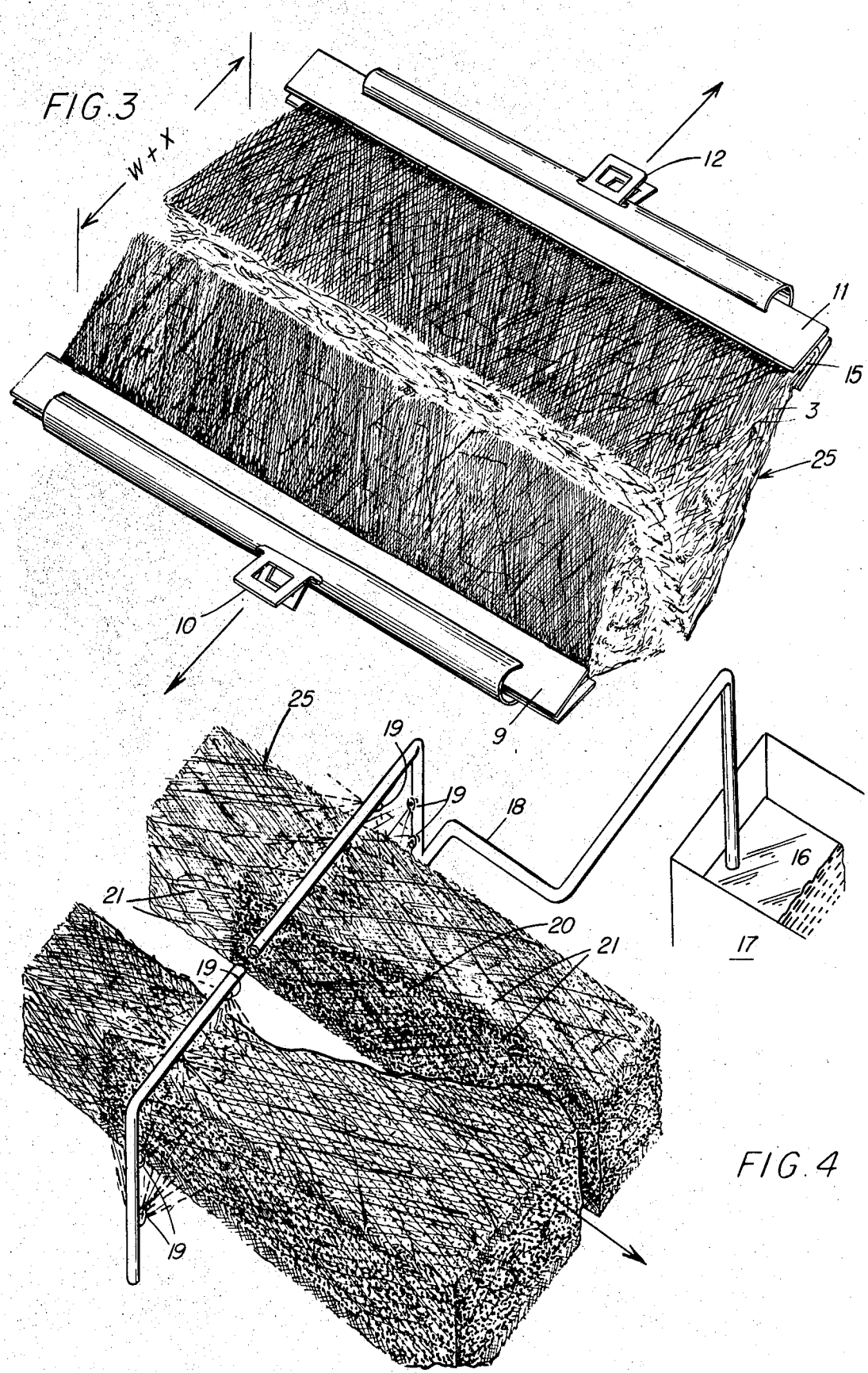

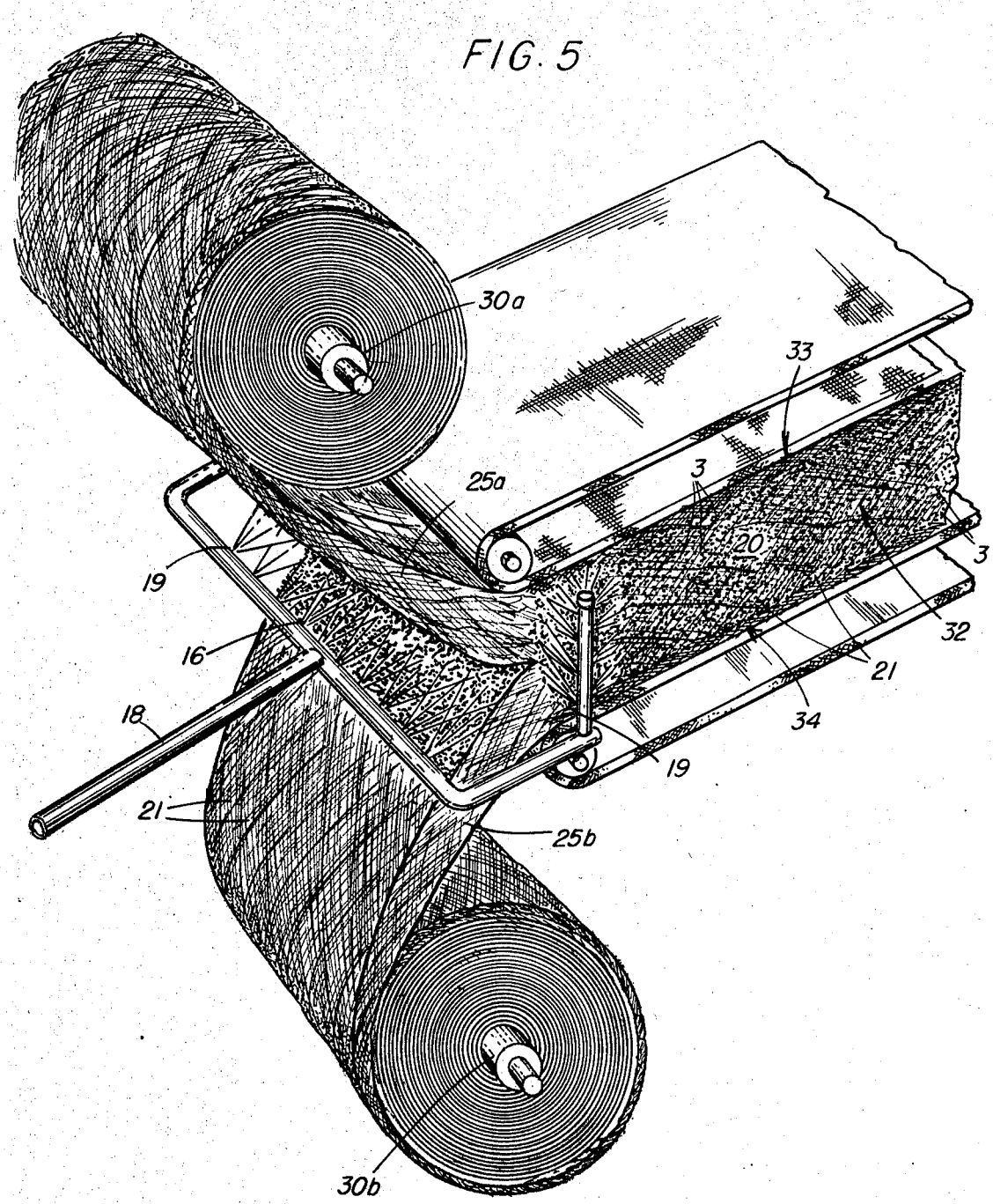

3,554,851
GLASS REINFORCED FOAM STRUCTURE AND
METHOD OF MAKING THE SAME
John Philip Modigliani, Morristown, N.J., assignor to
Artfiber Corporation, New York, N.Y., a corporation
of Delaware
Continuation of application Ser. No. 379,856, July 2,
1964, which is a continuation-in-part of applications
Ser. No. 175,709, Feb. 26, 1962, and Ser. No. 371,949,
June 2, 1964. This application Nov. 20, 1967, Ser. No.
689,222
Int. Cl. B32b 5/12, 5/20; B65h 81/04
U.S. Cl. 161—58                                         2 Claims

ABSTRACT OF THE DISCLOSURE

This disclosure relates to a novel product and method of forming the same, said product comprising a reinforced structure comprising an expanded mat of stretched glass fibers, said fibers forming interstices between them, the interstices of said mat containing a plastic foam, such as a polyurethane foam. The fibers of said mat extend through the surface of said foam into a resin surfacing layer.

---

This application is a continuation of my copending application Ser. No. 379,856, which was filed July 2, 1964 (now abandoned), which is a continuation-in-part of my copending application Ser. No. 175,709 which was filed Feb. 26, 1962 (now abandoned) and of my copending application Ser. No. 371,949 which was filed June 2, 1964 (now abandoned).

This invention relates to reinforced structures and methods of making the same. More particularly, the present invention relates to improved reinforced building structures and methods of making the same.

It is an object of the present invention to provide reinforced structures which are lightweight, rigid and strong and which can be made in many different shapes. It is a further object of the present invention to provide structures which have excellent insulating properties, impact resistance and load-bearing characteristics. It is still a further object of the present invention to provide novel methods of making building materials. It is a further object of this invention to provide reinforced structures for the packaging and transportation of goods. It is a still further object of this invention to provide corosion-resistant and thermally insulating reinforced structures which can be employed as surfacing on pipes, tanks, buildings and the like.

It is still another object of the present invention to provide reinforced structures which can readily be utilized in the construction of highway trailers, boats, freight cars, aircraft and the like.

It is a further object of the present invention to provide structures which are formed of a plastic foam which is reinforced by a matrix of stretched glass fibers.

With these and other objects in view, this invention consists in the construction and arrangement of parts, whereby the above objects are obtained, as more fully set forth hereinafter and as pointed out in the claims and illustrated in the accompanying drawing, wherein:

FIG. 1 is a diagrammatic isometric view of the first step of the methods of the present invention, showing the FIG. 2 is a diagrammatic isometric view of the second and third steps of the method of the present invention.

FIG. 3 is a diagrammatic isometric view of the fourth step of the method of the present invention.

FIG. 4 is a diagrammatic isometric view of the sixth step of the method of the present invention, showing the expanded mat cut away to reveal its inner construction.

FIG. 5 is a diagrammatic isometric view of a modification of the sixth step of the method of the present invention.

Figure 6:
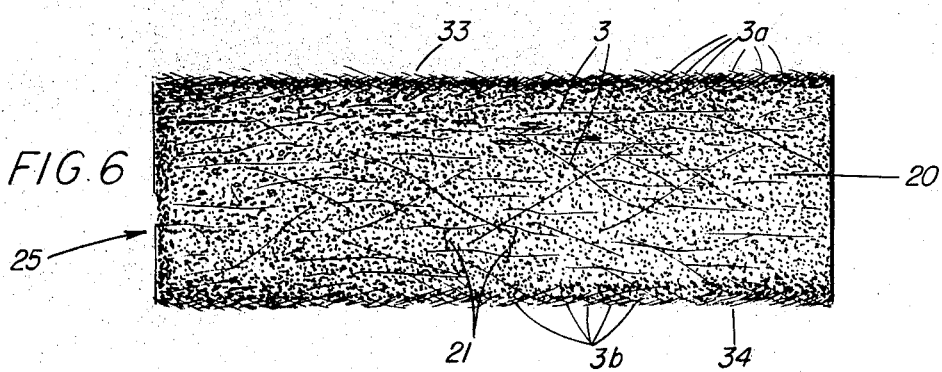
FIG. 6 is an isometric view of a segment of a structure formed in accordance with the present invention.

Referring now particularly to FIG. 1, drum 1, which is concentrically mounted on driving axle 1a, is shown rotating in the indicated direction. Glass spinning furnace 2 is moved along the width W of drum 1 in a back and forth motion as it spins glass threads 3 which are wound on the rotating drum. Alternatively, furnace 2 could be held in place and drum 1 moved back and forth. Successive layers of threads 3a and 3b are deposited on drum 1 at an angle to one another to form ribbon 4. The back and forth rate of the moving furnace may be varied to provide a greater concentration of fibers at the edges of the resulting ribbon 4, if desired, or can be varied to give a different fiber configuration, as will be described hereinafter.

Ribbon 4 is then removed from drum 1 by cutting ribbon 4 in a direction parallel to the axis of drum 1 to form edges 4a and 4b shown in FIG. 2.

In FIG. 2, ribbon 4, which can also be called a cocoon, is passed over conveyer belt 13 mounted on rollers 13a. In this embodiment of the invention, thermosetting resin 5, held in container 6, is passed through conduit 7 and is sprayed on ribbon 4 through nozzles 8. Ribbon 4 is then passed through opening 14a into drying chamber 14 and the dried coated ribbon 4, which will be identified as coated ribbon 15, is removed from drying chamber 14 through opening 14b.

In FIG. 3, coated ribbon 15 from drying chamber 14 is shown placed between holding means 9 and 11 and is shown pulled apart by movement of pulling means 10 and 12, which urged holding means 9 and 11 in opposite directions until the original width W of ribbon 15 has increased by an amount X, which corresponds to from about 9 to 99 times or more of width W, to form expanded mat 25.

In FIG. 4, expanded mat 25 is sprayed with foam ingredients 16, applied from container 17, through conduit 18 and nozzles 19. Foam 20 is formed in the interstices 21 of expanded mat 25.

In FIG. 5, two expanded mats 25a and 25b are fed together. These mats may be fed from rollers 30a and 30b, respectively, said mats 25a and 25b having first been rolled up on said rollers 30a and 30b, respectively. Foam ingredients 16, applied from container 17, through conduit 18 and nozzles 19, are sprayed on the two expanded mats 25a and 25b as they come together. Foam 20 is formed in the interstices 21 of the resulting combined mat 32. By regulating the degree to which the foam 20 penetrates mats 25a and 25b, free glass fibers 3 can readily be provided on the top surface 33 and bottom surface 34 of combined mat 32 for the subsequent application of a surfacing material, coating or adhesive material.

In FIG. 6, expanded mat 25 is shown wherein the interstices 21 between the fibers 3 are filled with foam 20. Free glass fibers 3a and 3b are shown at surfaces 33 and 34, respectively.

Figure 7:
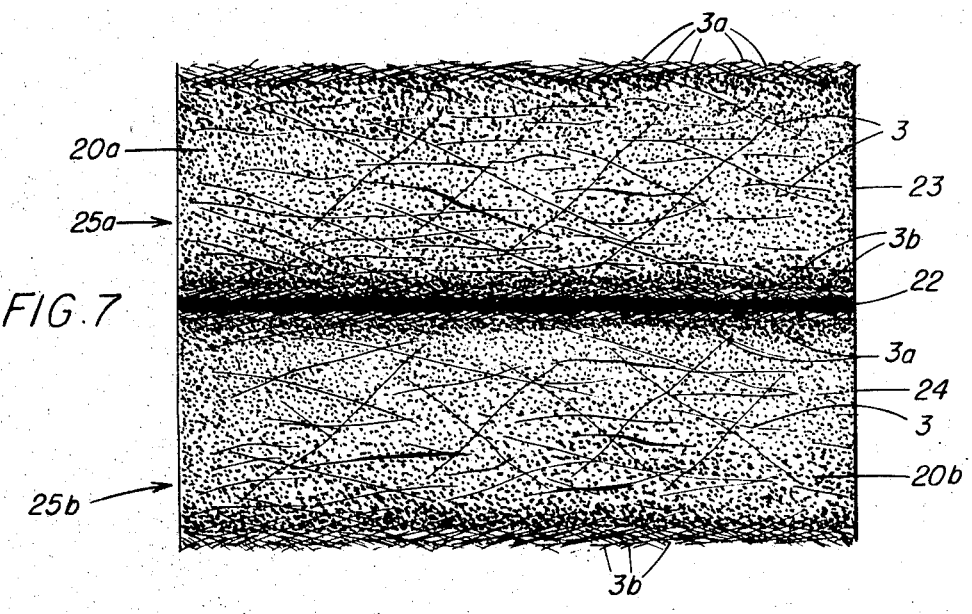
FIG. 7 is an isometric view of a segment of another structure formed in accordance with the present invention.

In FIG. 7, expanded mats 25a and 25b are shown wherein the interstices 21a and 21b, respectively, between the fibers 3a and 3b, respectively, are filled with foam 20a and 20b, respectively. Fibers 21a and 21b, respectively, extend beyond foam 20a and 20b, respectively, and the two structures 23 and 24 are joined together by means of a suitable adhesive 22.

Figure 8:
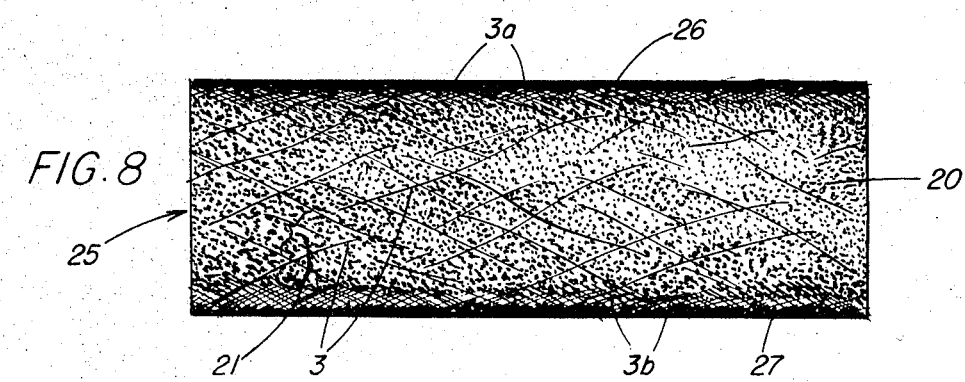
FIG. 8 is an isometric view of a segment of still another structure formed in accordance with the present invention.

In FIG. 8, expanded mat 25 is shown wherein the interstices 21 between the fibers 3 are filled with foam 20 and the fibers 3a and 3b extend along the outer surfaces of expanded mat 25 and are embedded in and covered by coatings 26 and 27, respectively.

In general, the present invention comprises a reinforced structure in which a plastic foam is formed in the interstices of a reinforcing member, comprising one or more mats of glass strands which have been stretched and orientated in such a manner that they hold the foam during the solidification of the foam and, after the foam has solidified, serve to stiffen and reinforce it. The recesses or spaces between the fibers are filled with a rigid foam or a semi-rigid foam, depending on the ultimate use of the structure.

The reinforced structures of this invention are useful as supporting members, such as beams or posts, and are particularly useful as flat or curved slabs for walls or ceilings and the like, since their construction and the method of fabrication are such that they can be made in very large sizes. They are also useful in cylindrical form as tanks, conduits or pipes or as coverings for the same and are useful in various other shapes, such as arches or semi-cylinders for other structural or architectural purposes. They may, thus, be used as prefabricated units in the construction of entire buildings or may be used as roofing, flooring, doors, walls, etc.

The reinforced structures of this invention may also be used, for example, in the construction of fall-out shelters, bridges, overhead walks, docks, boats, barges, swimming pools, vehicles such as railroad cars or trailer trucks, furniture, radar domes and the like. Furthermore, they may be used to form containers or boxes for transporting materials, particularly where the materials to be transported must be cushioned against blows and must be insulated against extremes of temperature.

The reinforced structures may be formed in situ. For example, an expanded mat can be held in place by simple means, such as by stapling it to a simple frame and thereafter foaming chemicals can be applied to the mat to form the foam within the mat. Surface coatings may then be applied, if desired. The present invention can, thus, eliminate the expensive jigs or retaining walls which would be required where the foaming done in the absence of the expanded mat.

As an additional example of the in situ production of the present structures, soil retaining structures can be produced in the field to aid in the cultivation or to prevent erosion of arid, swampy or shifting land. Furthermore, tanks or pipes may be given an insulating and corrosion-resistant coating without any preliminary surface treatment of the tanks or pipes. Expanded mats are merely held in place on the desired surfaces, for example by stapling a series of mats around a pipe and a foam-spraying gun or similar equipment is used to spray the foam ingredients into the expanded mat. When the foam has hardened, it results in a tough, insulating corrosion-resistant surface on the pipe. This present method and structures have many advantages over the application of a sleeve around the pipe and the subsequent formation of a foam in the space between the pipe and the sleeve: The present method—

(1) prevents the sagging of the foam during its formation,
(2) provides a covering which is dimensionally stable,
(3) provides a covering of more uniform density.

The building materials of the present invention may be made by a process which includes the following steps.

In the first step of the present invension, glass fibers are spun to form a glass felt or ribbon. This may be done in the manner described in U.S. Pat. 2,081,060, which issued on May 18, 1937, or by any other method whereby a ribbon or felt is formed of glass fibers which are oriented in a plurality of strata, the fibers in each stratum being disposed at an angle to the fibers in the adjacent stratum. The most convenient method for forming such a glass felt is to spin glass fibers in a conventional manner whereby the fibers are produced in a glass thread forming or spinning device and winding the resulting fibers on a rotating drum while the spinning device is moved backwards and forwards in an axial direction with regard to the drum, thereby depositing the fibers on the drum at slight angles from a direction perpendicular to the axis of the drum.

A single glass thread forming device may be employed for this purpose or a multiplicity of glass thread forming devices may be employed, as illustrated in the above-mentioned patent. It is preferred that each layer of glass fibers be deposited on the drum with the fibers oriented at an angle such that they cross the fibers which were deposited on the drum on the previous layer.

The rate at which alternate layers of glass fibers are applied to the drum may be varied such that the angle of the fiber to the axis of the drum in one layer may be different than the angle of the fibers in the layers immediately above and below said layer. In addition, the rate may further be controlled such that the angle to the axis of the drum in succeeding layers is slightly different from the preceding angle. In this manner, it is possible to vary the density of glass fibers in the final product. For example, a product having a greater density of fibers at the surfaces, can be made by applying the initial and final layers of glass fibers to the drum at a more rapid rate than the middle layers. Thus, the felt which is built up on the drum comprises superimposed helices of glass fiber or thread, the fibers or threads in one layer of each helix being disposed at an angle with relation to the threads of the helices in adjacent layers. Preferably, the acute angle which is formed between the fibers of any two adjacent layers is at least 1° and is no greater than 45°.

The fibers may also simply be laid out on a table or the like in successive layers in a similar criss-cross pattern, with the fibers in one layer being at an angle to the fibers in the adjacent layers, or the ribbon may be formed in any other suitable manner. In this regard, two or more layers of fibers may be employed in place of any single layer of fibers, so long as the over-all configuration of layers results in a generally criss-cross pattern.

This ribbon-forming operation will generally be conducted at room temperature, although variations in the temperature can occur, as is known in the art. When the forming of a ribbon is by means of a drum, the ribbon is removed from the drum after the desired thickness has been built up. While the size of the drum may vary over a wide range, a suitable commercial drum may be six feet in diameter and six feet in width. The drum is preferably rotated at a rate such that the glass thread is drawn on it at the rate of about 1500 to 3000 feet per minute. The travel of the glass forming device over the drum (or the drum past the glass forming device) will preferably be between 5 and 25 feet per minute, in a direction along the axis of the drum. The desired thickness will be dependent on the size of the ultimate product which is to be produced but will generally vary from about ¼ inch to several inches. The proper amount of glass to be deposited can be determined readily by weighing means. In general, for a drum 6 feet in circumference and 6 feet in width, the ribbon forming step will be conducted until from about ten pounds to about fifty pounds of glass have been formed into a ribbon on the drum. The ribbon is removed from the drum by cutting it in a direction which is parallel to the axis of the drum and which is, therefore, generally perpendicular to the orientation of the fibers on the drum. If desired, resin threads may be spun simultaneously with the glass threads or otherwise combined with the glass threads being wound on the drum, to form a resin fiber-glass fiber combination ribbon on the drum. A resin binder may also be applied to the ribbon, as it is formed, by spraying, brushing or the like.

In the second step of the method of the present invention, a binder is applied to the ribbon or sheet of condensed fibers which is formed in the first step. This step is not essential to the broad concept of the invention, but is a preferred embodiment of the invention. In this step, the binder should not be affected by the chemicals employed in the manufacture of plastic foams. The binder may be applied by spraying the ribbon with it or by dipping the ribbon in a bath of the binder. Alternatively, and particularly when a drum is employed, the binder may be used per se, in a solvent, or as an emulsion or suspension, and may be sprayed or otherwise applied as the ribbon is being formed. As a further alternative, as mentioned above, the binder may be employed in the form of long strands or threads which can be laid out in any suitable manner with the glass threads. For example, filaments of the binder could be spun and wound on a drum simultaneously with the spinning and winding on a drum of the glass filaments.

The binder may be applied by any one of the above-described methods or by a combination of these methods. When a binder is employed, in the preferred embodiment of this invention, it is important that there be good contact between the glass fibers and the binder and that the binder be substantially uniformly distributed throughout the glass fibers.

The binder may be a thermoplastic resin or a thermosetting resin. For example, it may be a polyester resin, an epoxy resin, a urea-formaldehyde resin, a phenol-formaldehyde resin, an acrylic resin, a polystyrene resin, a polyvinyl alcohol, a melamine resin, a polyolefin resin, such as polyethylene or polypropylene, a polyamide, a polysaccharide, such as starch, an asphalt or a similar material. Preferred binder materials include thermosetting resins such as polyester resins, epoxy resins, urea-formaldehyde resins and the like, and most preferably are phenolic resins, melamine resins or similar condensation thermosetting resins.

Epoxy resins which may be employed include the conventional epoxy resins, wherein such epoxides as dicyclopentadiene dioxide, vinylcyclohexene dioxide adduct of epichlorohydrin, and bisphenol-A are used in conjunction with hardeners such as phthalic anhydride, maleic anhydride, diethylenetriamine, methylene dianiline or triethylenetetramine. The usual additives and modifiers may also be present.

Polyester resins which may be employed include the conventional unsaturated polyesters prepared from dibasic acids or their anhydrides, such as phthalic anhydride, tetrahydrophthalic anhydride, maleic anhydride, fumaric acid, isophthalic acid and adipic acid with such alcohols as ethylene glycol, propylene glycol, diethylene glycol or dipropylene glycol in the presence of cross-linking agents such as styrene, substituted styrenes and diallyl phthalate. A particularly satisfactory polyester resin can be prepared employing tetrahydrophthalic anhydride and, for example, fumaric acid, diethylene glycol and styrene. Modifiers and other materials, for example stabilizers such as hydroquinone, may also be present.

Phenolic resins which may be employed include the conventional phenolic resins made by condensing monohydric phenols such as phenol, xylenols and polynuclear phenols, or polyhydric phenols, such as resorcinol, hydroquinone, pyrogallol, bisphenol-A, with an aldehyde, such as formaldehyde, furfural or acrolein in the presence of conventional acidic and/or basic catalysts. Other additives or modifiers may also be present. Melamine resins of similar characteristics may also be employed.

The resin is deposited on the surface of the glass fibers in the ribbon. Sufficient binder should preferably be employed in this step such that the resulting product contains from about 5 to about 30% by weight, and preferably about 20% by weight, of said thermosetting resin.

In the third step of the method of the present invention, the binder, when employed, is permitted to dry. Generally this will involve the removal of water from the product, although other solvents may also have to be removed. The drying may be a simple air-drying operation, by placing the product on a screen or in the air, where it is permitted to stand for from about eight hours to about a day. However, it is preferred to accelerate the drying of the binder-containing ribbon by heating it. This can be accomplished in an oven which is maintained at a temperature of from about room temperature to about 140° C. Under such conditions, the drying of the product may be accomplished in about three or four minutes, or even less when a very thin ribbon is employed.

In the next step of the method of the present invention, the dried resin-containing ribbon, which is preferably coated with a binder, is subjected to a stretching operation. For convenience, this step will be referred to as the fourth step of the present invention, although it is to be understood that the second and third steps may be eliminated, if desired; in which event, this step becomes the second step in the method of the present invention. This stretching operation comprises pulling the ribbon in a direction perpendicular to the general orientation of the fibers. When the ribbon has been formed by the use of the drum, the stretching is, thus, in a direction which would be axial were the ribbon still on the drum. The stretching operation may be conducted by holding the two ends to be pulled apart along their entire length by any suitable clamping means, and by firmly pulling the ends away from each other until the ribbon has been stretched from about ten to one hundred times its original length. Since the original length referred to corresponds to the width of the forming drum, when such a drum is employed, the stretching of the ribbon can thus be said to be a length which is about ten to one hundred times the width of the forming drum. The stretching may also be accomplished by pulling the ribbon using one or more moving belts or rollers.

The stretching operation is preferably conducted at room temperature, although somewhat lower or higher temperatures may be employed. It is preferred, however, that any binder which is employed is not permitted to harden until the stretching has been completed. In the case of thermosetting resins, these resins are preferably not used until the glass fibers have been stretched, although thermosetting resins which have been sprayed on the ribbon, while it was on the drum, have been found to be acceptable when the ribbon was stretched within half an hour from the spraying. In the case of thermoplastic materials, the conditions during stretching should be such that the binder is somewhat soft or liquid-like so that it tends to hold the glass fibers together at their joining points but does not prevent the glass fibers from stretching. Either type of resin may, if desired, be sprayed or otherwise applied to the ribbon after it has been stretched into an expanded web.

In the fifth step of the method of the present invention, the binder, when employed, is caused to harden. In the case of thermoplastic resins, this hardening may be accomplished by permitting the resin to cool, for example to room temperature. In the case of thermosetting resins, the binder-containing expanded mat is heated sufficiently to cure the resin. When strands of a binder resin have been employed, as can be done in accordance with one of the modifications of this invention, these strands will have been softened during stretching and will harden during the present step of the method of the present invention.

The resulting product is an expanded web or mattress wherein the dimensions have increased greatly in two directions. The length of the resulting expanded product will, thus, be from ten to one hundred times the length of the product prior to expansion and the thickness of the resulting product will also be many times the thickness of the original unexpanded ribbon. Such an expanded web comprises a structure of coated glass fibers having great resilience. It will generally have a density of from about 100 grams per square meter to about 500 grams per square meter. In general, the glass fibers will be at least as long as the thickness of the product and preferably longer than that length. Thus, the glass fibers extend through three dimensions in the structure and are intermeshed therein.

In the sixth step of the method of the present invention, a plastic foam is formed into the expanded web.

The plastic which is foamed into the expanded mat is preferably a polyurethane foam, but may be a similar foamed material, if desired. The foam may be semi-rigid for some applications but will, in general, be rigid polyurethane foam.

When polyurethane foam is employed, it can be formed of ingredients well known in the art of urethane foams. Generally, the foams are the reaction products of hydroxyl containing materials and isocyanates, such as tolylene diisocyanate. The foam can be blown by carbon dioxide gas generated by the reaction of water on the isocyanate. It can also be blown through the use of a fluorinated hydrocarbon or a similar low-boiling inert liquid. The hydroxyl-containing material employed may be a polyester, such as an adipic acid polyester, or may, more generally, be a polyether, such as polypropylene glycol or polypropylene glycol which has been modified with a triol.

The polyurethane foam can be employed as a one-shot system or as a prepolymer system. Thus, the isocyanate and polyester or polyether resin can be mixed anhydrously and introduced into the expanded mat, after which a solution of catalyst can be added in the proper proportion. Alternatively, the isocyanate, the resin and the catalyst, together with any desired additives, can be directly introduced into the expanded mat. This latter procedure is generally preferred, since it is quicker, easier and insures proper reaction of the ingredients within the interstices of the expanded glass fiber mat.

The resulting foam density within the expanded mat will generally be between about 1 and 50 pounds per cubic foot. Preferably, the density should be from about 2 to 30 pounds per cubic foot.

The foam-forming ingredients may be sprayed on the expanded mat, poured on the expanded mat or applied in any other manner which insures penetration of the ingredients into the mat.

A very important feature of the present invention is the fact that the foaming step can be conducted without requiring any retaining means. While retaining means, such as a mold, or a press or a similar structure may be employed, I have discovered unexpectedly that the expanded glass fiber mat employed in the present invention serves as a retaining means for the foam. Thus, the foam is left in the shape in which the mat or mats are positioned. The foam-forming ingredients may be applied in sufficient amount such that the foam completely fills the voids of the expanded mat. Preferably, however, they are added in an amount such that the outer surfaces of the expanded mat contain free fibers which are not surrounded by foam. In this manner, the outer surfaces contain free glass fibers which can be employed to anchor the structure to similar structures or to apply an outer coating or surfacing to the structure.

The foam is then permitted to harden in the usual manner and the resulting product is an extremely strong reinforced structure.

The resulting reinforced structure can then be joined with similar materials or with other building materials, using conventional adhesives, resin sprays or the like. It can also be covered with a sheet or layer of surfacing material or facing, for example, a thermosetting resin of the type described above may be applied by spraying, brushing, etc. to form a layer on one or more of the surfaces of the structure and then cured in place. Surfacing can also be with sheets or facings as described in my copending application Ser. No. 175,709. Other facings, such as plastic sheets, metal, asbestos, etc. may also be used, if desired.

If desired, reinforcing element may be incorporated within the expanded glass fiber mat immediately prior to the injection of the foam in the expanded glass fibers and prior to any opportunity for the glass fibers to lose the orientation given them during the expansion operation.

The reinforcing elements utilized in accordance with the present invention are preferably glass fibers, ropes or spun glass rovings. However, they may also be nylon, metal wire or similar material having good strength and stretchability. The glass fibers are preferred because they have the most desirable qualities of strength, compatibility, adhesion to the other components which are employed and stretchability.

A particularly desirable reinforcing element is a rod or rope formed of glass fibers in the manner described in U.S. Pat. 2,219,066 and thereafter impregnated with a thermosetting resin. Such rods provide additional strength to the structures, where desired, and can readily be prepared in the field by simply cutting a piece of such glass rope to the desired length, impregnating it with a thermosetting resin and curing the resin. Since the resin can also be used in the manufacture of an outer surface for the building structures, a minimum of ingredients are required for the fabrication of complex parts.

Reinforcing elements, as well as pipes, conduits for wires and the like, can also be placed between two expanded webs and foaming chemicals introduced into the entire structure, whereby a building unit can be simply constructed without the necessity of any forming devices and which may contain any desired configuration of pipes and the like. The building units can be covered along their flat surfaces by surface mats of glass fibers, similar to the ribbons removed from the drums described above but compressed by having been passed through a set of pressing rollers. The surface mats can then be further covered with a layer of a thermosetting resin to provide a building material of great strength. Asbestos paper and the like may also be used as a surface for the foam-filled expanded glass mats.

The expanded glass mats may be formed in limitless shapes and sizes and by foaming directly into them, building materials can be made with great simplicity. For example, an expanded mat can be hung horizontally, vertically or in any orientation and the foaming ingredients injected, sprayed or otherwise introduced into the mat. The mat holds the foaming ingredients and prevents the foam which forms from sagging. Once the foam has hardened, the resulting structure can be covered, if desired, as described above. Similarly, a pipe or other structure can be wrapped or otherwise covered with an expanded mat and foaming ingredients then introduced therein. In all cases, the resulting products have excellent dimensional stability and great strength.

The method of the present invention, in addition to resulting in a superior reinforced building material, also inherently simplifies the production of the product. Since the foam can readily be left within the limits of the expanded mat, the expanded mat aids in the control of the otherwise difficult foam-forming operation.

It is a particularly advantageous feature of the present invention that the structures of this invention can readily be fabricated at the site of their ultimate use. For example, the expanded mat of coated glass fibers can be transported in rolled-up or other form and can then be opened up and formed into the desired shape at the building site. The expanded mat can then be placed in position and, if desired, reinforcing elements inserted through it or sandwiched between two layers of expanded mat. The resulting structure can then be sprayed or otherwise filled with foam-forming chemicals, for example glycol, isocyanate and water to form a polyurethane foam on the site. One or both sides of the building material, after the foam has been produced, can then be covered, if desired, with a facing, as described above. Similarly, the reinforced structures of this invention, as an insulating and corrosion-resistant covering, can be applied to existing structures, such as buildings, tanks, pipes and the like, without the necessity of cleaning or treating the surfaces in any way prior to the fabrication of the reinforced structures.

Another outstanding feature of this invention is the fact that building units, such as walls, can be made in one piece in an extraordinary range of sizes. For example, they may vary in thickness from about an inch through the normal thicknesses of several inches, to eight inches or more in thickness.

While only monofilaments of glass have been described above, the invention comprehends the use of mixtures of monofilaments and strands of glass fibers as well as all strands of glass fibers. The fibers or strands should be at least 5 inches or more in length in order to form a satisfactory expanded mat. They are preferably present in the structure in long pieces at least as long as the narrowest dimension of the structure being formed, and most preferably, each strand extends substantially continuously from one outer surface to a second outer surface of the structure being formed.

It is to be understood that the expanded web may be formed into a variety of shapes before the foam is introduced into it. For example, it may be undulated and foam introduced into both the expanded web and into the troughs formed by the undulations of the web. A series of expanded webs may also be stood on their edges and foam introduced into them and between them to form a structure having very great impact resistance and good dimensional stability. These and other modifications may be made without departing from the spirit of the present invention.

Unless otherwise specified, all parts and percentages, as used in this specification, are by weight.

I claim:

1. The method of forming a reinforced structure which comprises the following steps:

(a) forming a continuous ribbon of glass fibers comprising a plurality of layers of long glass filaments by continuously drawing glass filaments and winding said filaments about a drum to form a plurality of layers, each of said layers containing substantially parallel glass filaments which are at an angle to the glass filaments in adjacent layers, substantially all of said filaments having a general lay in a direction which is transverse to the width of said continuous ribbon;

(b) cutting said ribbon in a direction transverse relative to the general lay of said fibers to form a multi-layered mat of long, substantially continuous filaments;

(c) stretching said ribbon in a transverse direction relative to the general lay of said glass fibers until said ribbon has elongated from about 10 to about 100 times its original width to form an expanded web;

(d) forming a cellular plastic foam within said expanded web to form a foam-containing expanded mat having segments of glass filaments extending beyond said foam-containing expanded mat;

(e) coating said foam-containing expanded mat with a resin which incorporated at least potrions of said segments;

(f) curing said resin to form an outer facing on said reinforced structure.

2. A resin-coated foam material reinforced with a fibrous glass structure formed by the process of claim 1.

References Cited
UNITED STATES PATENTS

| | | | |
|---|---|---|---|
| 3,137,604 | 6/1964 | Bosch | 161—69X |
| 3,050,427 | 8/1962 | Slayter et al. | 156—26 |
| 3,036,946 | 5/1962 | Jackson | 156—174X |
| 3,030,256 | 4/1962 | Rosenthal | 161—Boat |
| 2,879,197 | 3/1959 | Muskat et al. | 161—159X |
| 2,609,320 | 9/1952 | Modigliani | 156—174 |
| 3,183,285 | 5/1965 | Boylan | 264—45 |

ROBERT F. BURNETT, Primary Examiner

M. A. LITMAN, Assistant Examiner

U.S. Cl. X.R.

156—79, 174, 181; 161—160